US006734700B2

United States Patent
Chiu et al.

(10) Patent No.: US 6,734,700 B2
(45) Date of Patent: May 11, 2004

(54) DIFFERENTIAL OUTPUT DRIVER

(75) Inventors: Jui-Ta Chiu, Hsinchu (TW); Hsi-Yuan Wang, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 27 days.

(21) Appl. No.: 10/283,597

(22) Filed: Oct. 30, 2002

(65) Prior Publication Data

US 2003/0162345 A1 Aug. 28, 2003

(30) Foreign Application Priority Data

Feb. 22, 2002 (TW) ........................................ 91103218 A

(51) Int. Cl.$^7$ .............................................. H03K 17/16
(52) U.S. Cl. .............................. 326/27; 326/83; 326/86
(58) Field of Search ............................... 326/26, 27, 82, 326/83, 86, 89, 90

(56) References Cited

U.S. PATENT DOCUMENTS

| 4,975,599 A | * 12/1990 | Petrovick et al. | .............. 326/32 |
| 5,491,436 A | * 2/1996 | Austin | ........................ 327/108 |
| 5,912,569 A | * 6/1999 | Alleven | ........................ 327/108 |
| 6,329,840 B1 | * 12/2001 | Moyal | .......................... 326/58 |
| 2002/0180483 A1 | * 12/2002 | Lim et al. | ...................... 326/83 |

* cited by examiner

*Primary Examiner*—Don Le
(74) *Attorney, Agent, or Firm*—Volpe and Koenig, P.C.

(57) ABSTRACT

A differential output driver device for receiving a differential input voltage within a specific range having a first portion of a relatively higher voltage and a second portion of a relatively lower voltage and obtaining an identical voltage variation for output voltages of the first portion and the second portion is provided. The differential output driver device includes a step-down circuit for receiving the first portion of the relatively higher voltage and lowing the relatively higher voltage to a first output voltage, a step-up circuit for receiving the second potion of the relatively lower voltage and rising the relatively lower voltage to a second output voltage, a first compensation circuit electrically connected to the step-down circuit for providing a first bias to transform the first output voltage into a first compensation voltage, and a second compensation circuit electrically connected to the step-up circuit for providing a second bias to transform the second output voltage into a second compensation voltage, wherein the second compensation voltage and the first compensation voltage have the identical voltage variation value, so as to make the driver generate a periodic output voltage having a substantially regular waveform.

36 Claims, 9 Drawing Sheets

|  | TT | FS | SF | FF | SS |
|---|---|---|---|---|---|
| Rise Time (ns) | 7.3 | 7.5 | 7.1 | 6.9 | 7.7 |
| Fall Time (ns) | 7.3 | 7.5 | 7.2 | 6.8 | 7.7 |
| Crossover Voltage (V) | 1.5 | 1.5 | 1.6 | 1.5 | 1.5 |
| Average | -- | -- | 99% | 102% | -- |

| Rise Time (ns) | 6.4 | 6.5 | 6.3 | 6.1 | 6.8 |
|---|---|---|---|---|---|
| Fall Time (ns) | 6.4 | 6.5 | 6.4 | 6.1 | 6.8 |
| Crossover Voltage (V) | 1.7 | 1.6 | 1.7 | 1.7 | 1.7 |
| Average | -- | -- | 98% | -- | -- |

| Rise Time (ns) | 5.8 | 5.9 | 5.7 | 5.6 | 6.1 |
|---|---|---|---|---|---|
| Fall Time (ns) | 5.9 | 6.0 | 5.8 | 5.6 | 6.2 |
| Crossover Voltage (V) | 1.8 | 1.8 | 1.9 | 1.8 | 1.8 |
| Average | 98% | 98% | 98% | -- | 98% |

DIFFERENTIAL OUTPUT DRIVER

FIELD OF THE INVENTION

This invention relates to a differential output driver, and more particular to a differential output driver which is applied to a transmission terminal of a USB (universal Serial Bus) interface.

BACKGROUND OF THE INVENTION

Generally, a conventional taper buffer, as shown in FIG. 1A, is only a simply digital design without any compensation to the process. Thus, this kind of circuits contributes to the variation of the process greatly. For example, when using a simulation program (e.g. H-spice) to simulate the circuit under the condition that the voltage of PTNT (PMOS set as typical and NMOS set as typical) is 3.3 Volt, the crossover voltage and rise/fall time ($T_r/T_f$, $T_r=T_f$) are adjusted as 1.65 Volt and 6n sec respectively. However, under the conditions of the output loading and the output voltage are identical, e.g. PFNS (PMOS set as fast, and NMOS set as slow) and PSNF (PMOS set as slow and NMOS set as fast), the crossover voltage might be altered to range between 1.2 and 2.05 Volt and the specific value of the rise/fall time will becomes larger than 1.1 or smaller that 0.9, e.g. $T_r=7n$ sec, $T_f=5n$ sec and the crossover voltage will also range between 1.2 and 2.05 Volt. When the rise/fall time of the input control signal $D_{in}^+/D_{in}^-$ are set as identical, as shown in FIG. 1B, and the process is set as PTNT, by executing the simulation program (e.g., H-spice), the simulation result is $T_r=T_f$ and the crossover voltage=$V_{DD}/2$ (as shown in FIG. 1C). When the process is set as PFNS or PSNF, by executing the simulation program (for simulating the error caused by the shift in the process), the simulation result is $T_r$ $T_f$ and the crossover voltage is not $V_{DD}/2$ any longer (as shown in FIGS. 1D and 1E).

For solving the problem described above, a compensational differential output driver is developed. As shown in FIG. 2, the circuit structure includes a current source, a first current mirror set, a second current mirror set, a first output buffer, and a second output buffer. However, the first current mirror set includes transistors MP1 and MP2. The second current mirror set includes transistors MN1 and MN2. The first output buffer includes transistors MP3 and MN3. And the second output buffer includes transistors MP4 and MN4. Also, the transistors MP1 and MP2 of the first current mirror set have an identical current I which flows through the path 1 constituted by MP1 and MN1, so that the first current mirror set and the second current mirror set can cause an equal current to achieve $V_{out}=\overline{V}_{out}$, as shown in FIG. 1B. Furthermore, the current by the process will not be influenced, so that the situations in FIGS. 1D and 1E will not occur. But this method still has some drawbacks described as followed:

1. Because transistors MP2 and MN2 are respectively provided by the first and the second current mirror sets, the gate voltages thereof must have some particular limitations. If the restriction on $T_r/T_f$ is necessary, the size of the taper buffer in this method will become larger than conventional one. That's because the gate voltages are respectively not 0 and $V_{DD}$ any longer, so as to need a larger current which results in the bigger size of the taper buffer, generally 3~4 times or more.

2. For not interfering with the first and the second current mirrors, the transistors MP3, MP4, MN3, and MN4 must relatively become larger for controlling the current, generally two times or more of the transistors MP2 and MN2.

3. Because the current of the transistor MP2 in the current mirror set is larger, the current of the transistor MP1 will also become larger generally. Thus this method needs more area and power.

Because of the technical defects described above, the applicant keeps on carving unflaggingly to develop a "differential output driver device" through wholehearted experience and research.

SUMMARY OF THE INVENTION

It is an object of the present invention to provide a differential output driver device and system for well matching the rise/fall time ($T_r/T_f$, $T_r=T_f$) of the transmission terminal of a differential output driver device and not being interfered by the process.

It is another object of the present invention to provide a differential output driver device and system which are applied to a USB interface for reducing the noise in the process.

In accordance with an aspect of the present invention, a differential output driver for receiving a differential input voltage within a specific range having a first portion of a relatively higher voltage and a second portion of a relatively lower voltage and obtaining an identical voltage variation for output voltages of the first portion and the second portion includes a step-down circuit for receiving the first portion of the relatively higher voltage and lowing the relatively higher voltage to a first output voltage, a step-up circuit for receiving the second potion of the relatively lower voltage and rising the relatively lower voltage to a second output voltage, a first compensation circuit electrically connected to the step-down circuit for providing a first bias to transform the first output voltage into a first compensation voltage, and a second compensation circuit electrically connected to the step-up circuit for providing a second bias to transform the second output voltage into a second compensation voltage, wherein the second compensation voltage and the first compensation voltage have the identical voltage variation value, so as to make the driver generate a periodic output voltage having a substantially regular waveform.

Preferably, the differential output driver is applied to a transmission terminal of a USB (Universal Serial Bus) interface.

Preferably, the first portion of the relatively higher voltage is ranged between 3 and 5 Volts.

Preferably, the second portion of the relatively lower voltage is ranged between 0 and 3 Volts.

Preferably, the step-down circuit includes a first PMOS (P-type Metal-Oxide-Semiconductor) transistor, a first NMOS (N-type Metal-Oxide-Semiconductor) transistor, and a second NMOS transistor.

Certainly, the second NMOS transistor can be a switch.

Certainly the first NMOS includes at least a set of serially connected NMOS transistors.

Certainly, the second NMOS includes at least a set of serially connected NMOS transistors.

Certainly, the first PMOS provides a third bias for cooperating with the relatively higher voltage to actuate the first NMOS transistor to generate the first output voltage by means of a voltage dividing.

Certainly, the third bias can be equivalent to the second bias.

Preferably, the first compensation circuit includes a second PMOS transistor, a third NMOS transistor, and a fourth NMOS transistor.

Certainly, the second PMOS transistor can be a switch.

Certainly, the second PMOS transistor includes at least a set of serially connected PMOS transistors.

Certainly, the third NMOS transistor includes at least a set of serially connected NMOS transistors.

Certainly, the fourth PMOS provides the first bias for cooperating with the first output voltage to actuate the third NMOS transistor to generate the first compensation voltage by means of a voltage dividing.

Preferably, the step-up circuit includes a third PMOS transistor, a fourth PMOS transistor, and a fifth NMOS transistor.

Certainly, the third PMOS transistor can be a switch.

Certainly, the third PMOS transistor includes at least a set of serially connected PMOS transistors.

Certainly, the fourth PMOS transistor includes at least a set of serially connected PMOS transistors.

Certainly, the fifth NMOS provides a fourth bias for cooperating with the relatively lower voltage to actuate the fourth PMOS transistor to generate the second output voltage by means of a voltage dividing.

Certainly, the fourth bias can be equivalent to the first bias.

Preferably, the second compensation circuit includes a fifth PMOS transistor, a sixth PMOS transistor, and a sixth NMOS transistor.

Certainly, the sixth NMOS transistor can be a switch.

Certainly, the fifth PMOS transistor includes at least a set of serially connected PMOS transistors.

Certainly, the sixth PMOS transistor includes at least a set of serially connected PMOS transistors.

Certainly, the fifth PMOS provides the second bias for cooperating with the second output voltage to actuate the sixth PMOS transistor to generate the second compensation voltage by means of a voltage dividing.

Preferably, the fourth bias is equivalent to the first bias.

In accordance with another aspect of the present invention, a differential output driver system including a first differential output driver and a second differential output driver connected in parallel for receiving a first portion of a relatively higher voltage and a second portion of a relatively lower voltage and obtaining for output voltages of the first portion and the second portion an identical voltage variation wherein the first differential output driver includes a first voltage divider for receiving the first portion of the relatively higher voltage and lowing the relatively higher voltage to a first output voltage, and a first compensator electrically connected to the first voltage divider for providing a first bias to transform the first output voltage into a first compensation voltage, and the second differential output driver includes a second voltage divider for receiving the second portion of the relatively lower voltage and rising the relatively lower voltage to a second output voltage, and a second compensator electrically connected to the second voltage divider for providing a second bias to transform the second output voltage into a second compensation voltage, wherein the second compensation voltage and the first compensation voltage have an identical voltage variation value, so as to make the system generate a periodic output voltage set having a substantially regular waveform.

Preferably, the differential output driver system is applied to a transmission terminal of a USB (Universal Serial Bus) interface.

Certainly, the first portion of the relatively higher voltage is ranged between 3 and 5 Volts.

Preferably, the second portion of the relatively lower voltage is ranged between 0 and 3 Volts.

Preferably, the first voltage divider is equivalent to the second voltage divider.

Preferably, the first compensator is equivalent to the second compensator.

Preferably, the first bias is equivalent to the second bias.

Preferably, the output voltages of the first portion and the second portion have a crossover output voltage.

Certainly, the crossover output voltage can be an average of the first portion of the relatively higher voltage and the second portion of the relatively lower voltage.

The above objects and advantages of the present invention will become more readily apparent to those ordinarily skilled in the art after reviewing the following detailed descriptions and accompanying drawings, in which:

BRIEF DESCRIPTION OF THE DRAWINGS

FIGS. 6A~6C show the tables of the data while executing a simulation program in a preferred embodiment according to the present invention.

DESCRIPTION OF THE PREFERRED EMBODIMENT

Figure 1A:
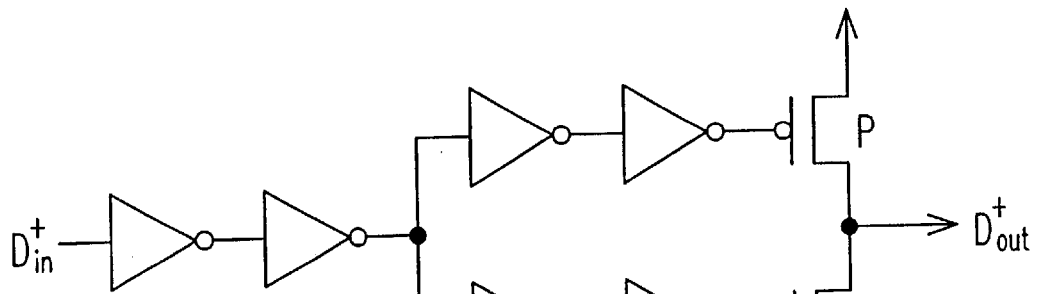
FIG. 1A shows a schematic view of the circuit of the general taper buffer.
Figure 1A:
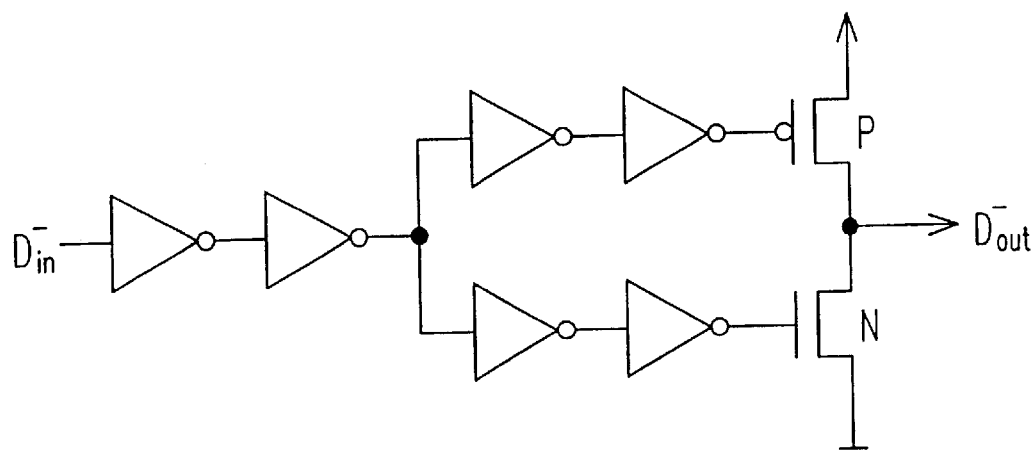
Figure 1B:
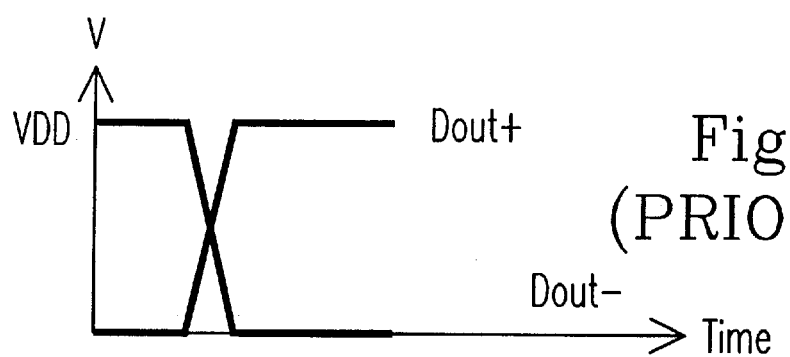
FIG. 1B shows a voltage-time plot of the PMOS which is not compensated.
Figure 1C:
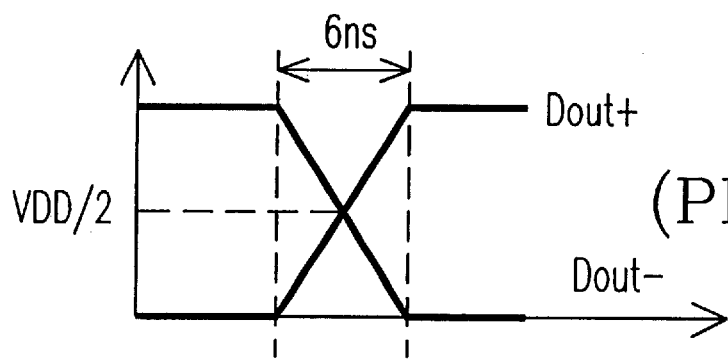
FIG. 1C shows a voltage-time plot while executing a simulation program as PTNT.
Figure 1D:
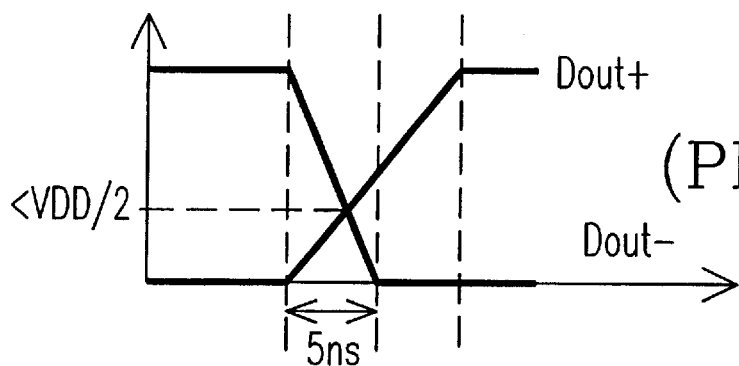
FIG. 1D shows a voltage-time plot while executing a simulation program as PSNF.
Figure 1E:
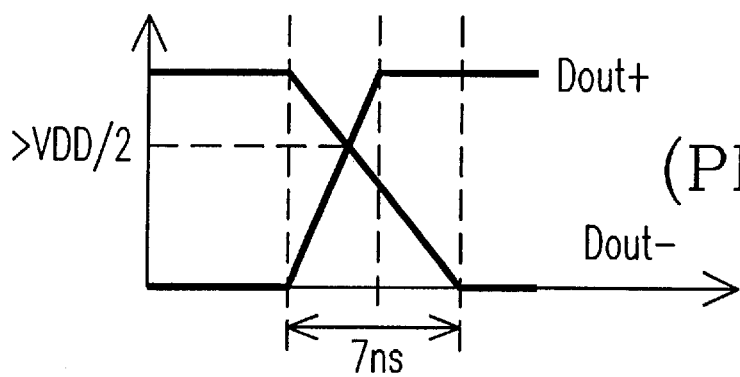
FIG. 1E shows a voltage-time plot while executing a simulation program as PFNS.
Figure 2:
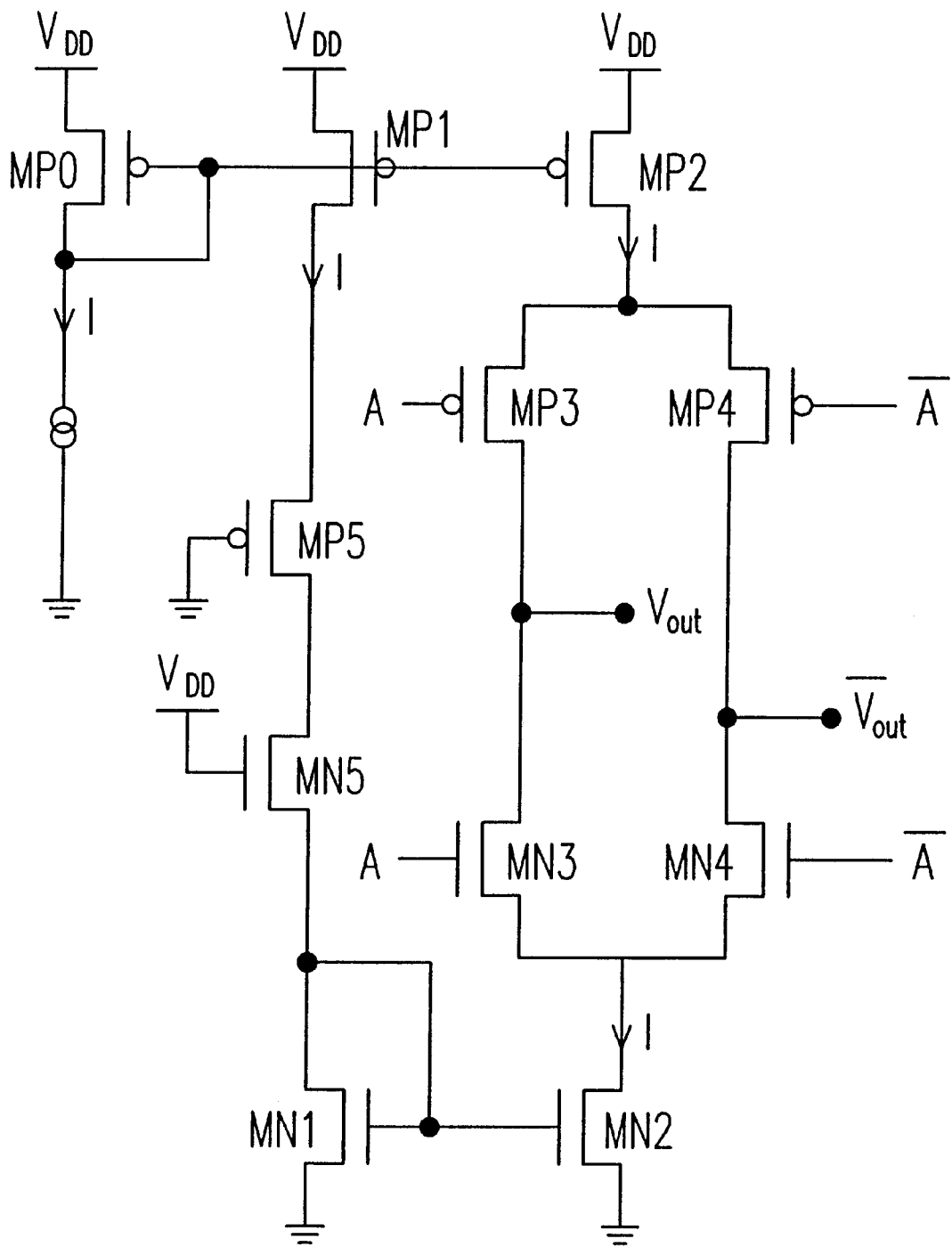
FIG. 2 shows a schematic view of the circuit of the conventional output driver.
Figure 3:
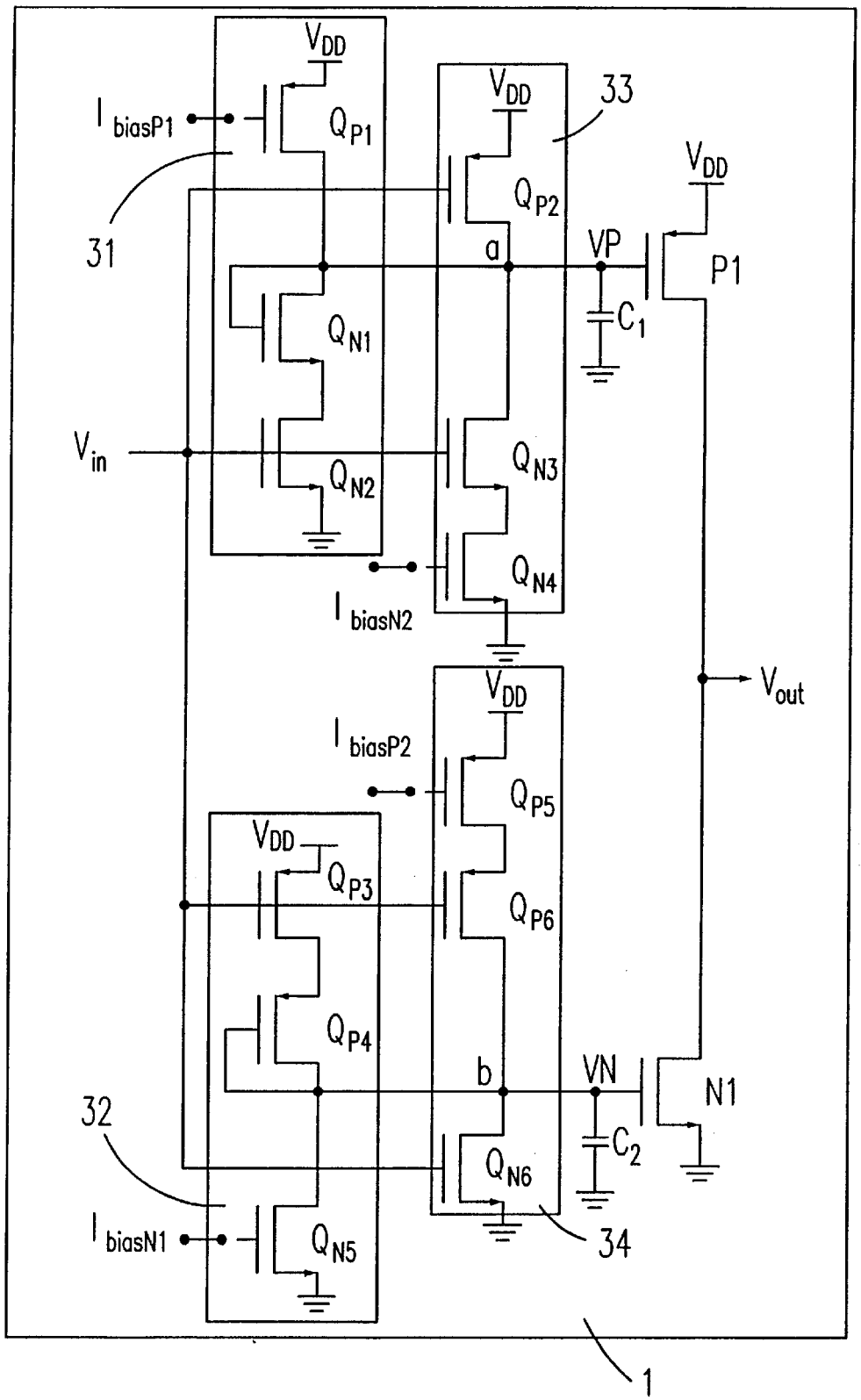
FIG. 3 shows a schematic view of the detailed circuit structure of the differential output driver device in a preferred embodiment according to the present invention.

Please refer to FIG. 3. FIG. 3 illustrates a schematic view of the differential output driver device in a preferred embodiment according to the present invention. The differential output driver device 1 can be applied to a transmission terminal of a USB (Universal Serial Bus) interface for receiving an input voltage and outputting output voltages which has a first portion (3~5 Volt) of the relatively higher voltage and a second portion (0~3 Volt) of a relatively lower voltage, so as to obtain an identical voltage variation of the output voltages of the first and the second portions. The device includes a step-down circuit 31, a step-up circuit 32, a first compensation circuit 33, and a second compensation circuit 34. The step-down circuit 31 is constituted by one set of PMOS $Q_{p1}$ and two sets of NMOS $Q_{N1}$ and $Q_{N2}$. The first compensation circuit 33 is constituted by one set of PMOS $Q_{P2}$ and two sets of NMOS $Q_{N3}$ and $Q_{N4}$. The step-up circuit 32 is constituted by two sets of PMOS $Q_{P3}$ and $Q_{P4}$ and one set of NMOS $Q_{N5}$. The second compensation circuit 34 is constituted by two sets of PMOS $Q_{P5}$ and $Q_{P6}$ and one set of NMOS $Q_{N6}$. Furthermore, each of the transistors $Q_{N2}$, $Q_{P2}$, $Q_{P3}$, and $Q_{N6}$ can be provided as a switch.

Figure 4A:
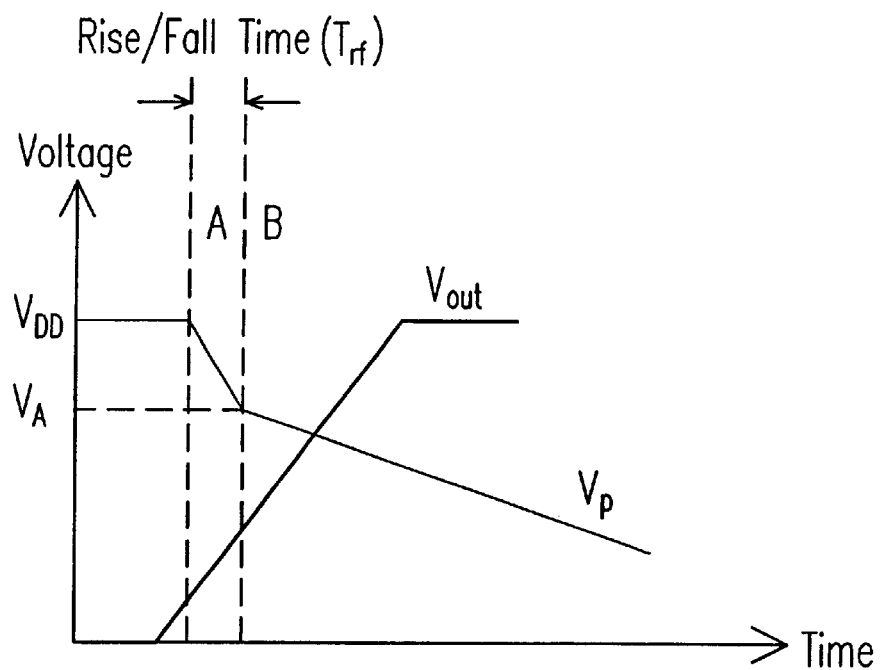
FIG. 4A shows a voltage-time plot of PMOS in a preferred embodiment according to the present invention.
Figure 4B:
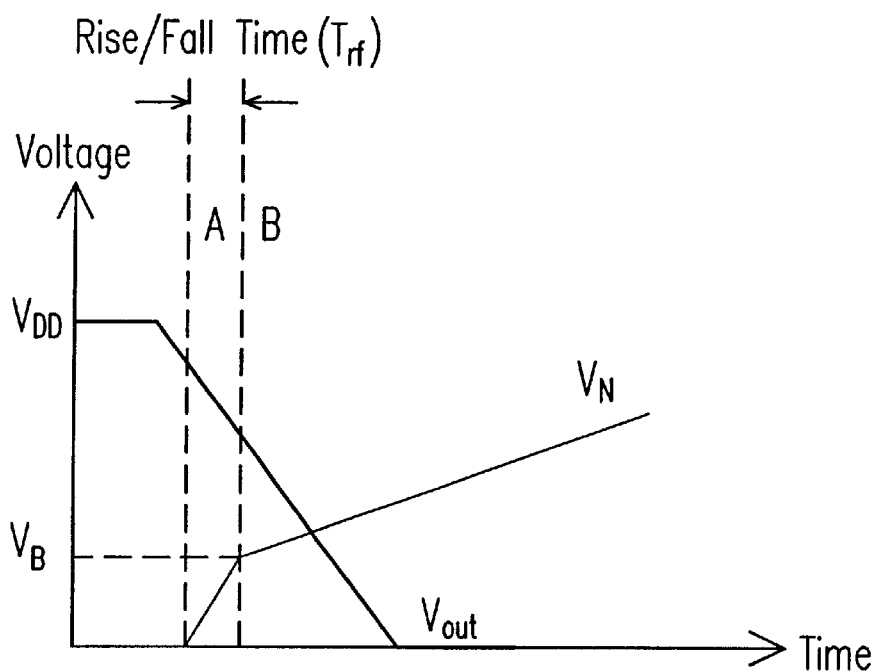
FIG. 4B shows a voltage-time plot of NOS in a preferred embodiment according to the present invention.

For more detailedly understanding the practical circuit of the present invention, please refer to FIGS. 4A and 4B simultaneously. FIGS. 4A~4B illustrate the output voltage-time plot in a preferred embodiment according to the present invention.

1. The actions in A area: (how to achieve $T_f=T_r$)

Firstly, when the input voltage $V_{in}=V_{DD}$ and the transistor $Q_{N2}$ is turned on, the transistor $Q_{N1}$ will also be conducted at the same time. Then a bias current $I_{biasP1}$ provides a loading current to the transistor $Q_{P1}$ to discharge the capacitor C1 rapidly, so as to fall the first output voltage $V_p$ of the step-down circuit (namely the "a" point in FIG. 4). And because of the dividing effect between the transistors $Q_{P1}$ and $Q_{N1}$, $V_P=V_A$ which is sufficient to turn on a transistor P1 can be obtained.

Simultaneously, the transistor $Q_{N3}$ is turned off, so that the second output voltage $V_N$ of the step-up voltage (namely the "b" point in FIG. 4) is 0. When the input voltage $V_{in}=0$, the transistor $Q_{N2}$ is turned off. Thus the first input voltage $V_P$ of the step-down circuit (namely the "a" point in FIG. 4) is equal to $V_{DD}$.

At the same time, when the transistor $Q_{P3}$ is turned off, the transistor $Q_{P4}$ is conducted, too. And the other bias current $I_{biasN1}$ provides a loading current to the transistor $Q_{P1}$ to charge the capacitor C2 rapidly, so as to rise the second output voltage $V_N$ of the step-up circuit (namely the "b" point in FIG. 4). And because of the dividing effect between the transistors $Q_{N5}$ and $Q_{P4}$, $V_P=V_B$ which is sufficient to turn on the transistor N1 can be obtained.

2. The actions in B area (making $V_P$ and $V_N$ continuously working and obtaining identical voltage variation of $V_P$ and $V_N$):

When $V_P$ falls to $V_A$ or $V_N$ rises to $V_B$, for obtaining an identical variation of $V_P$ and $V_N$, $V_A$ must be changed to conform to the rise of $V_A$. Thus, $V_A$ can be obtained by means of the formula as follows:

$$V_A = V_{tn} + \sqrt{(I_{bias}/Kn)}$$

Wherein $V_{tn}$ is the threshold voltage of NMOS.

$I_{Bias}$ refers to the bias current $I_{biasN1}$ here.

As the same, $V_B$ can be obtained by means of the following formula:

$$V_B = V_{tp} + \sqrt{(I_{bias}/Kp)}$$

Wherein $V_{tp}$ is the threshold voltage of PMOS.

$I_{bias}$ refers to the bias current $I_{biasP1}$ here.

The advantages of the present invention are $V_P$ and $V_N$ will have an identical voltage variation by adjusting $I_{biasP2}$ and $I_{biasN2}$. That's because $V/t=I/C$ ($C*V=I*t$), the identical voltage variation of the $V_P$ and $V_N$ can be obtained only by controlling equal specific values of the $I_{bias}/C1$ and $I_{bias}/C2$.

Figure 5A:
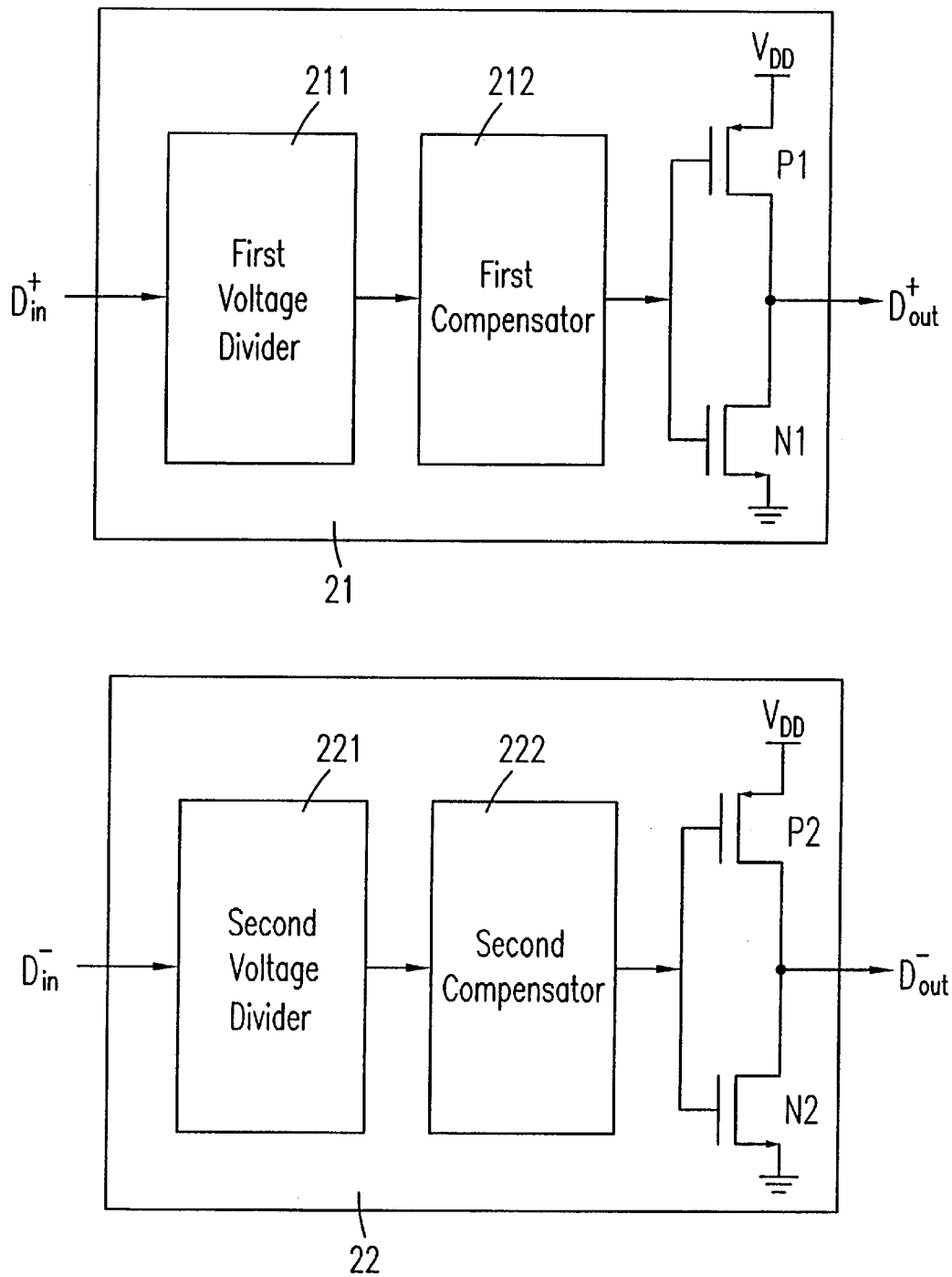
FIG. 5A shows a block diagram of the circuit of the differential output driver system in a preferred embodiment according to the present invention.
Figure 5B:
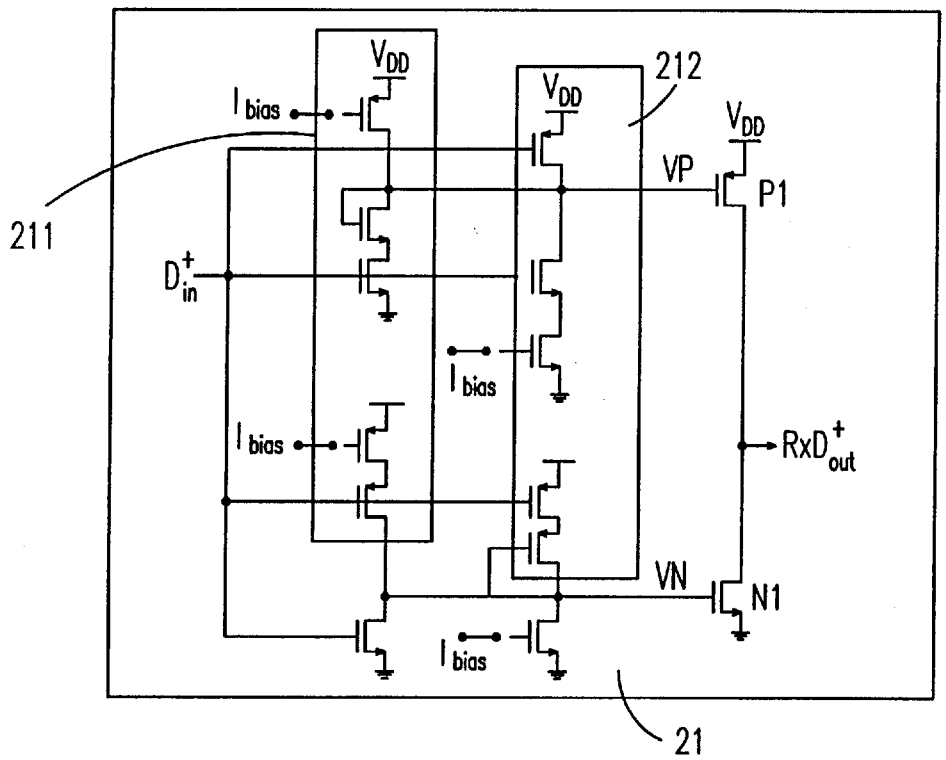
FIG. 5B shows a schematic view of the detailed circuit structure of the differential output driver system in a preferred embodiment according to the present invention.
Figure 5B:
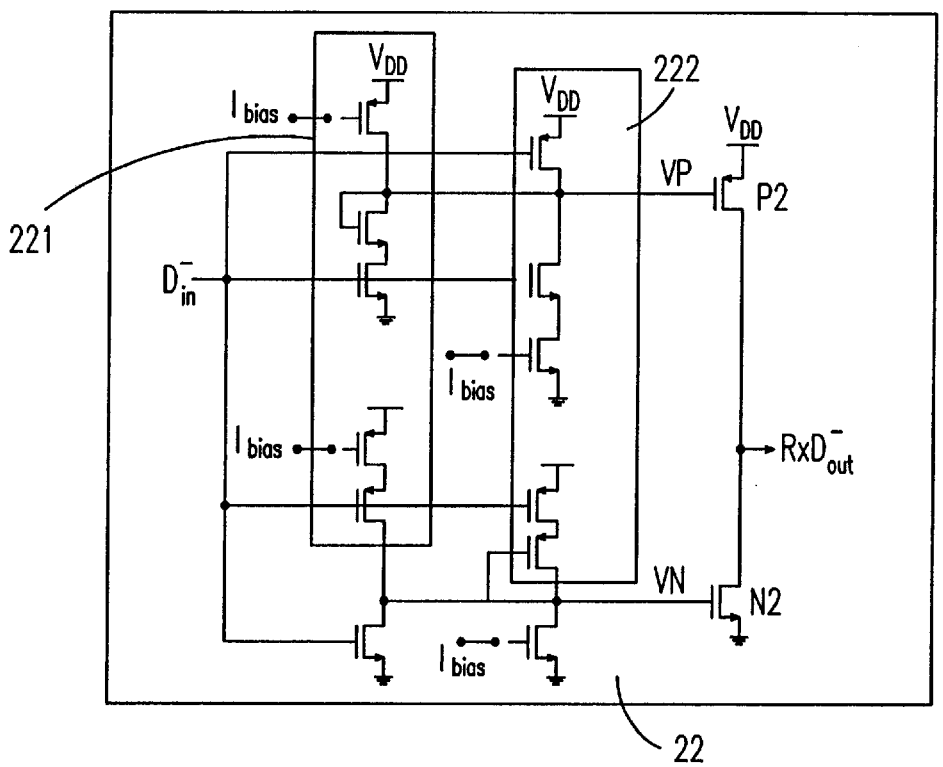

Please refer to FIGS. 5A~5B. FIGS. 5A~5B show the circuit block diagram and the detailed circuit structure of the differential output driver system in a preferred embodiment according to the present invention. The differential output driver system of the present invention includes a first differential output driver device 21 and a second differential output driver device 22 connected in parallel. The first differential output driver device 21 includes a first voltage divider 211 and a first compensator 212. The second differential output driver device 22 includes a second voltage divider 221 and a second compensator 222.

The first divider 211 of the first differential output driver device receives the relatively higher input voltage $D_{in}^+$ which is transformed to a first output voltage. Then the first compensator 212 provides a first bias to transform the first output voltage to a first compensation voltage, and a relatively higher output voltage $D_{out}^+$ is outputted through the transistors P1 and N1.

At the same time, the second divider 221 of the second differential output driver device receives the relatively lower input voltage $D_{in}^-$ which is to a second output voltage. Then the second compensator 222 provides a second bias to transform the second output voltage to a second compensation voltage, and a relatively higher output voltage $D^{out}_+$ is outputted through the transistors P1 and N1. Among these, the first compensator and the second compensator have an identical voltage variation.

Figure 5C:
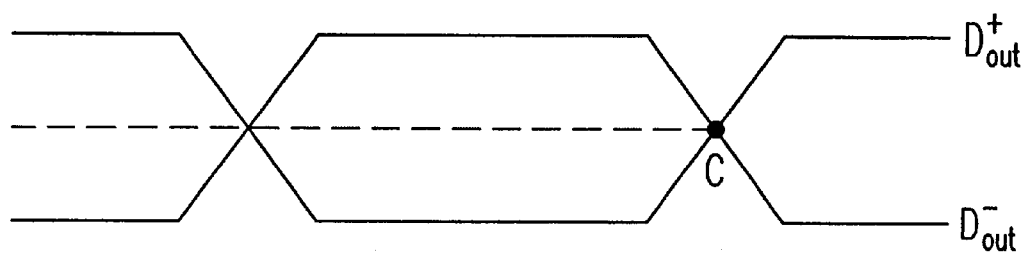

Please refer to FIG. 5C. FIG. 5C shows the waveform of the differential output voltage in a preferred embodiment according to the present invention. When the relatively higher input voltage $D_{in}^+$ is $V_{DD}$, the relatively lower input voltage $D_{in}^-$ is 0, and the fall time $T_f$ equals to the rise time $T_r$, the relatively higher output voltage $D_{out}^+$ and the relatively lower output voltage $D_{out}^-$ are in reverse phase and the crossover voltage will equal to $V_{DD}/2$ (namely the "c" point in FIG. 5C). And if the relatively higher input voltage $D_{in}^+$ and the relatively lower input voltage $D_{in}^-$ are reverse to each other and $D_{in}^+=V_{DD}$, $D_{in}^-$ will equal to 0. On the contrary, if $D_{in}^+=0$, $D_{in}^-=V_{DD}$.

Please refer to FIGS. 6A~C. FIGS. 6A~C show the data come from the simulation program in a preferred embodiment according to the present invention, wherein it is set as PTNT (the input of PMOS set as typical and the input of NMOS set as typical). The input voltages in Table 1 is 3V, in Table 2 is 3.3 V, and in Table 3 is 3.6 V. According to Tables 1~3, the averages percentage of the rise and fall times are all close to 1. That means the rise and fall times by utilizing the device can match to each other very well.

In view of the aforesaid, the differential output driver device of the present invention achieves the purpose of matching the rise and fall times through adjusting the bias current of the input and improving the effect by means of the practical simulating result. Consequently, the present invention conforms to the demand of the industry and owns inventiveness.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A differential output driver for receiving a differential input voltage within a specific range having a first portion of a relatively higher voltage and a second portion of a relatively lower voltage and obtaining an identical voltage variation for output voltages of said first portion and said second portion, comprising:

a step-down circuit for receiving said first portion of said relatively higher voltage and lowing said relatively higher voltage to a first output voltage;

a step-up circuit for receiving said second potion of said relatively lower voltage and rising said relatively lower voltage to a second output voltage;

a first compensation circuit electrically connected to said step-down circuit for providing a first bias to transform said first output voltage into a first compensation voltage; and a second compensation circuit electrically connected to said step-up circuit for providing a second bias to transform said second output voltage into a second compensation voltage, wherein said second compensation voltage and said first compensation voltage have said identical voltage variation value, so as to make said driver generate a periodic output voltage having a substantially regular waveform.

2. A driver according to claim 1 wherein said differential output driver is applied to a transmission terminal of a USB (Universal Serial Bus) interface.

3. A driver according to claim 1 wherein said first portion of said relatively higher voltage is ranged between 3 and 5 Volts.

4. A driver according to claim 1 wherein said second portion of said relatively lower voltage is ranged between 0 and 3 Volts.

5. A driver according to claim 1 wherein said step-down circuit comprises a first PMOS (P-type Metal-Oxide-Semiconductor) transistor, a first NMOS (N-type Metal-Oxide-Semiconductor) transistor, and a second NMOS transistor.

6. A driver according to claim 5 wherein said second NMOS transistor is a switch.

7. A driver according to claim 5 wherein said first NMOS includes at least a set of serially connected NMOS transistors.

8. A driver according to claim 5 wherein said second NMOS includes at least a set of serially connected NMOS transistors.

9. A driver according to claim 5 wherein said first PMOS provides a third bias for cooperating with said relatively higher voltage to actuate said first NMOS transistor to generate said first output voltage by means of a voltage dividing.

10. A driver according to claim 9 wherein said third bias is equivalent to said second bias.

11. A driver according to claim 1 wherein said first compensation circuit comprises a second PMOS transistor, a third NMOS transistor, and a fourth NMOS transistor.

12. A driver according to claim 11 wherein said second PMOS transistor is a switch.

13. A driver according to claim 11 wherein said second PMOS transistor includes at least a set of serially connected PMOS transistors.

14. A driver according to claim 11 wherein said third NMOS transistor includes at least a set of serially connected NMOS transistors.

15. A driver according to claim 11 wherein said fourth PMOS provides said first bias for cooperating with said first output voltage to actuate said third NMOS transistor to generate said first compensation voltage by means of a voltage dividing.

16. A driver according to claim 1 wherein said step-up circuit includes a third PMOS transistor, a fourth PMOS transistor, and a fifth NMOS transistor.

17. A driver according to claim 16 wherein said third PMOS transistor is a switch.

18. A driver according to claim 16 wherein said third PMOS transistor includes at least a set of serially connected PMOS transistors.

19. A driver according to claim 16 wherein said fourth PMOS transistor includes at least a set of serially connected PMOS transistors.

20. A driver according to claim 16 wherein said fifth NMOS provides a fourth bias for cooperating with said relatively lower voltage to actuate said fourth PMOS transistor to generate said second output voltage by means of a voltage dividing.

21. A driver according to claim 20 wherein said fourth bias is equivalent to said first bias.

22. A driver according to claim 1 wherein said second compensation circuit comprises a fifth PMOS transistor, a sixth PMOS transistor, and a sixth NMOS transistor.

23. A driver according to claim 22 wherein said sixth NMOS transistor is a switch.

24. A driver according to claim 22 wherein said fifth PMOS transistor includes at least a set of serially connected PMOS transistors.

25. A driver according to claim 22 wherein said sixth PMOS transistor includes at least a set of serially connected PMOS transistors.

26. A driver according to claim 25 wherein said fifth PMOS provides said second bias for cooperating with said second output voltage to actuate said sixth PMOS transistor to generate said second compensation voltage by means of a voltage dividing.

27. A driver according to claim 1 wherein said fourth bias is equivalent to said first bias.

28. A differential output driver system including a first differential output driver and a second differential output driver connected in parallel for receiving a first portion of a relatively higher voltage and a second portion of a relatively lower voltage and obtaining for output voltages of said first portion and said second portion an identical voltage variation wherein:

said first differential output driver comprises:
a first voltage divider for receiving said first portion of said relatively higher voltage and lowing said relatively higher voltage to a first output voltage; and
a first compensator electrically connected to said first voltage divider for providing a first bias to transform said first output voltage into a first compensation voltage; and said second differential output driver comprises:
a second voltage divider for receiving said second portion of said relatively lower voltage and rising said relatively lower voltage to a second output voltage; and
a second compensator electrically connected to said second voltage divider for providing a second bias to transform said second output voltage into a second compensation voltage, wherein said second compensation voltage and said first compensation voltage have an identical voltage variation value, so as to make said system generate a periodic output voltage set having a substantially regular waveform.

29. A system according to claim 28 wherein said differential output driver system is applied to a transmission terminal of a USB (Universal Serial Bus) interface.

30. A system according to claim 28 wherein said first portion of said relatively higher voltage is ranged between 3 and 5 Volts.

31. A system according to claim 28 wherein said second portion of said relatively lower voltage is ranged between 0 and 3 Volts.

32. A system according to claim 28 wherein said first voltage divider is equivalent to said second voltage divider.

33. A system according to claim 28 wherein said first compensator is equivalent to said second compensator.

34. A system according to claim 28 wherein said first bias is equivalent to said second bias.

35. A system according to claim 28 wherein said output voltages of said first portion and said second portion have a crossover output voltage.

36. A system according to claim 35 wherein said crossover output voltage is an average of said first portion of said relatively higher voltage and said second portion of said relatively lower voltage.

* * * * *